(12) United States Patent
Phillips et al.

(10) Patent No.: US 8,128,408 B2
(45) Date of Patent: Mar. 6, 2012

(54) DOOR BREACH TRAINING SYSTEM

(76) Inventors: Darron Phillips, San Antonio, TX (US); Jeff Wright, Bulverde, TX (US); Jeff Lambert, Canyon, TX (US)

( * ) Notice: Subject to any disclaimer, the term of this patent is extended or adjusted under 35 U.S.C. 154(b) by 611 days.

(21) Appl. No.: 12/139,092

(22) Filed: Jun. 13, 2008

(65) Prior Publication Data

US 2009/0208914 A1 Aug. 20, 2009

(51) Int. Cl.
*G09B 19/00* (2006.01)
(52) U.S. Cl. .......... 434/226; 434/219; 52/204.1
(58) Field of Classification Search .......... 434/219, 434/226; 52/204.1, 213
See application file for complete search history.

(56) References Cited

U.S. PATENT DOCUMENTS

| | | | |
|---|---|---|---|
| 2,358,364 A * | 9/1944 | Trumpour | 89/1.1 |
| 4,598,647 A * | 7/1986 | Biedess | 109/77 |
| 5,906,493 A | 5/1999 | Bishop | |
| 6,877,988 B2 | 4/2005 | Phillips | |
| 7,611,356 B1 * | 11/2009 | Bishop | 434/226 |
| 2002/0095885 A1 * | 7/2002 | Sampson | 52/202 |
| 2005/0050816 A1 * | 3/2005 | Manning et al. | 52/213 |
| 2006/0240391 A1 | 10/2006 | Sovine et al. | |
| 2010/0109294 A1 * | 5/2010 | Klementowicz et al. | 280/656 |

* cited by examiner

*Primary Examiner* — Gene Kim
*Assistant Examiner* — Joseph B Baldori

(57) ABSTRACT

A door breach training system comprising a first restraint assembly connecting a door to a frame. The door is attached to a lock jamb of the frame with a first restraint assembly that exposes a shear joint to impact from a projectile, such as shotgun round. Another embodiment further comprises attachment of the door to the hinge jamb with at least one second restraint assembly that functionally simulates a typical door hinge and exposes a shear joint to impact from a ballistic round. The preferred embodiment includes replaceable lock panels and hinge panels that are designed to break in a known manner in order to replicate those same failure modes for both door locks and door hinges in typical residential and commercial construction environments.

12 Claims, 9 Drawing Sheets

DOOR BREACH TRAINING SYSTEM

CROSS REFERENCE TO RELATED APPLICATIONS

This original nonprovisional application claims the benefit of U.S. provisional application No. 61/028,959, filed Feb. 15, 2008 and entitled "Door Breach Training System," which is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to training devices for public-safety and military personnel. More specifically, the present invention is a door breach training system that allows such personnel to quickly and efficiently train for forced-entry scenarios requiring ballistic breaching.

2. Description of the Related Art

Both public-safety and military personnel are often faced with the need to perform a forced entry into structures. A forced entry can be, and often is, a life-threatening scenario during which every second counts. Shaving seconds from the operation can mean the difference between life-saving tactical surprise and life-ending ambush. Knowledge of and training with the variations in door-breaching techniques, however slight, as well as practice and conditioning for the door breaching operation, are vital to a tactical situation.

A ballistic door breach relies upon a projectile that is fired from a breaching device, such as a shotgun. The projectile transfers energy into the lock-and-latch mechanism and/or hinges of a door in order to dislodge them or defeat their ability to fix the door to the frame. Although the military sometimes utilizes specialty weapons for this purpose, the majority of ballistic breaches are preformed with a normal shotgun using buckshot, birdshot, or special rounds designed for breaching that are very similar to a single slug. These types of rounds have increased energy compared to rounds more typically utilized for hunting or target shooting.

Presently, forced-entry training is performed using conventional doors and frames. While this certainly provides realistic training opportunities, such an approach is quite costly, not only because of the expense of constantly replenishing door supplies, but also because of the installation costs. In fact, while few would admit to trading life-saving training for savings in door costs, many training facilities limit door breach training to a practical minimum, simply because of the present cost implications.

Accordingly, a realistic and lower cost door breach training system would well serve those who perform emergency or law enforcement-related door breaching operations. Such a system would also benefit civilians whose lives often depend on such operations (e.g., entrapped victims and hostages) by providing a cost-effective, quickly-repeatable alternative means of training for door breach operations.

BRIEF SUMMARY OF THE INVENTION

The present invention replicates those scenarios trainees encounter when performing a ballistic door breach in a cost-effective manner. The system solves the two major problems associated with ballistic door breach training: the expense of supplying actual doors (which are destroyed after each breach) and requiring the trainee to properly place the shots to effectively defeat both the lock-and-latch mechanisms and/or hinges that attach the door to a frame.

The system allows for repeated use of a shotgun (or other ballistic device) to defeat the simulated locks and simulated hinges of a door during military and law enforcement breaching operations. This type of action is highly destructive by nature and also requires the proper placement of the breaching round in order to be successful.

The present invention comprises a frame having a lock jamb and a hinge jamb, a door attached to the hinge jamb, and a first restraint assembly that simulates a typical lock-and-latch mechanism used in inward opening doors. The first restraint assembly exposes a shear joint to impact from a shot originating on the outward side of the door. In the preferred embodiment, the system additionally includes at least one second shear restraint having a shear joint that may be similarly defeated.

In the preferred embodiment, the first restraint assembly comprises at least one defeatable lock panel made of high-density polyethylene. The second restraint assembly preferably comprises a defeatable hinge panel made of high-impact polystyrene.

DETAILED DESCRIPTION OF THE INVENTION

The present invention is a door breach training system that replicates the scenarios encountered when performing an actual ballistic door breach. The system addresses the two major problems associated with breach training: first, the expense involved in supplying realistic doors that are destroyed after each breach, and second, forcing a trainee to properly place shots to effectively defeat the lock mechanisms and/or hinge mechanisms that attach the door to the frame. As used herein, "inward side" and "inward direction" refer to the side of the system and direction into which the door would open were it functional as an actual door. Similarly, "outward side" and "outward direction" refer to the side of the system and direction toward which the simulated breach is being conducted by the trainee.

Figure 1:
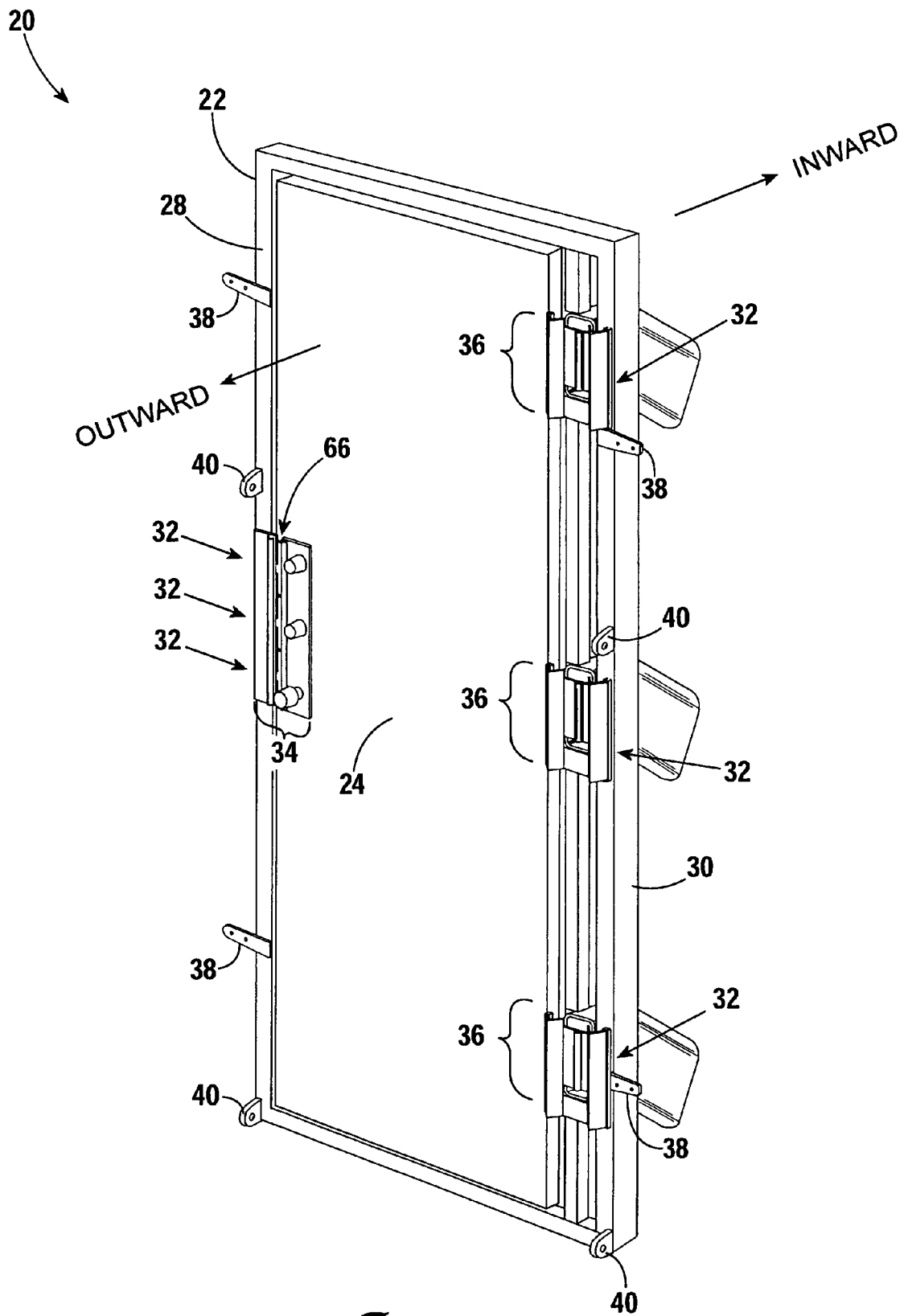
FIG. 1 is a front isometric view of the preferred embodiment of the present invention.

FIG. 1 is a front isometric view of the preferred embodiment of the door breach training system 20. The system 20 comprises a frame 22 adapted to support a door 24. The door 24 is connected to a lock jamb 28 and hinge jamb 30 of the frame 22 at a number of restraint points 32 with a first restraint assembly 34 and a plurality of second restraint assemblies 36. The first restraint assembly 34 functionally emulates a lock-and-latch mechanism (e.g., a deadbolt lock) that might be found in a typical residential door, but allows for quick resetting and provides for minimum damage to the system 20 during a simulated breach. The first restraint assembly 34 defines an opening 66 through which a ballistic round may be targeted to defeat the assembly and detach the door 24 from the frame 22. Similarly, the second restraint assemblies 36 functionally simulate typical inward-opening hinges—that is, hinges that would be positioned on the inward side of the system 20—that would be found in a typical exterior door system. Each second restraint assemblies 36 functions as a shear restraint such that, when sheared, the door 24 is detached from the hinge jamb 30 at the corresponding restraint point 32. After a simulated breach, the defeated components of the first restraint assembly 34 and second restraint assemblies 36 are quickly replaceable to minimize downtime between simulated breaches.

Multiple frame ears 38 and leg mounts 40 provide attachment points for the frame 22 to be quickly connected to a framing system of an existing structure, such as a vacant building used for tactical exercises, using conventional fastening techniques, such as wood screws and/or bolts and nuts. According to the preferred embodiment, the frame 22 and door 24 are constructed from 16-gauge steel to provide for longevity and damage tolerance as compared to less rugged materials as well as to approximate the weight of typical exterior doors, although alternative materials may be used.

Figure 2:
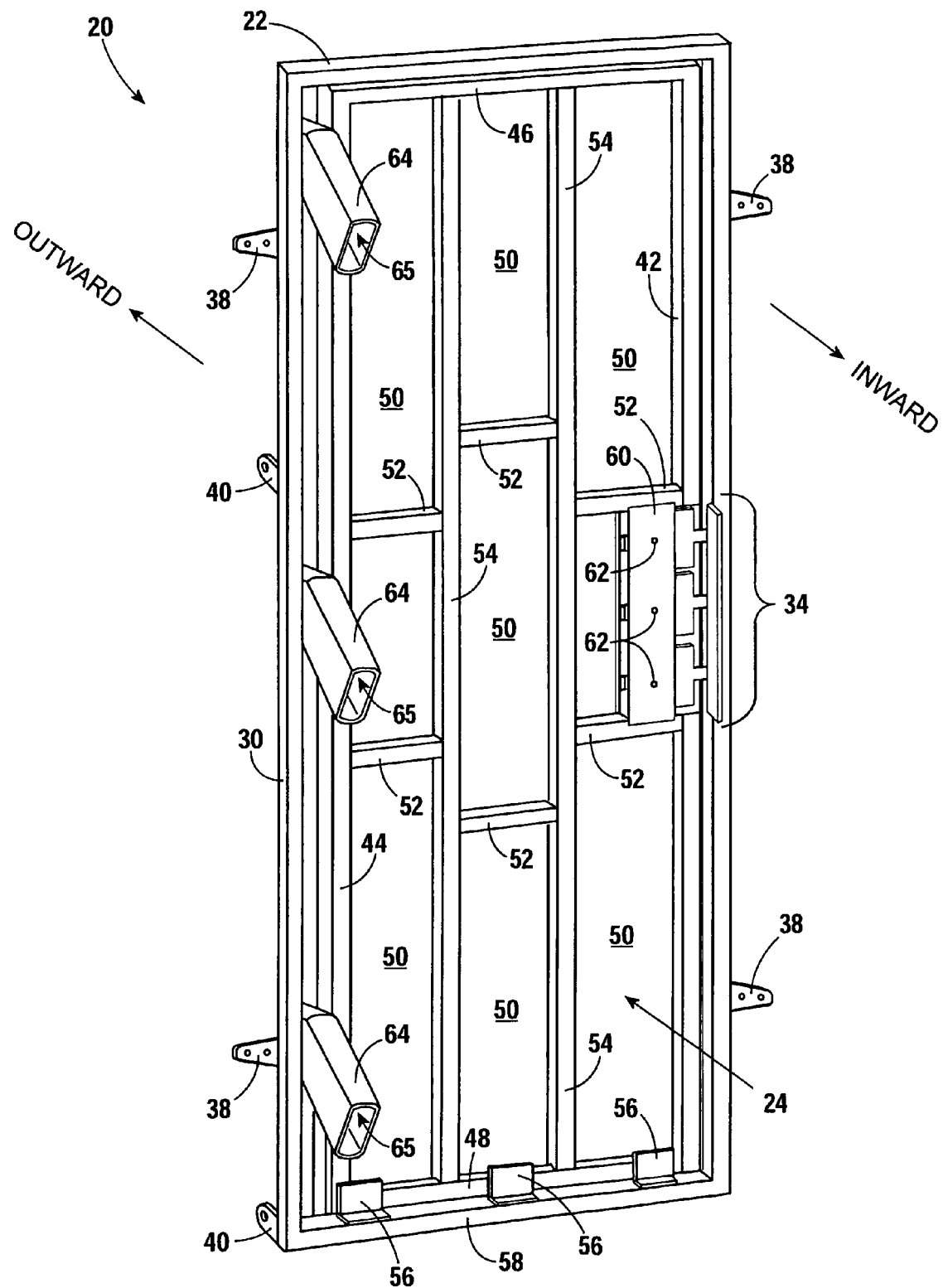
FIG. 2 is a rear isometric view of the preferred embodiment of the present invention.

FIG. 2 is a rear isometric view of the preferred embodiment of the system 20. The door 24 is defined by two exterior vertical beams 42, 44 and two exterior horizontal beams 46, 48, to which a door surface 50 is attached. A number of interior horizontal beams 52 and interior vertical beams 54 provide additional support for the door 24 as well as fastening points for the door surface 50. Three hinges 56 connect the lower exterior horizontal beam 48 to a lower frame member 58 to allow the door 24 to rotate with respect to the frame 22.

The first restraint assembly 34 described with respect to FIG. 1 further comprises a rectangular mounting plate 60 fixedly attached to two of the interior horizontal beams 52, which mounting plate 60 has multiple screw holes 62 disposed therethrough for fastening to the other components of the first restraint assembly 34. A steel shot deflector 64 having an open end 65 is positioned inwardly of each second restraint assembly 36 (see FIG. 1) to redirect shot and debris resulting from a ballistic breach attempt in a downward (i.e., safe) direction. In the preferred embodiment, each shot deflector 64 is fastened or otherwise connected to the hinge jamb 30.

Figure 3:
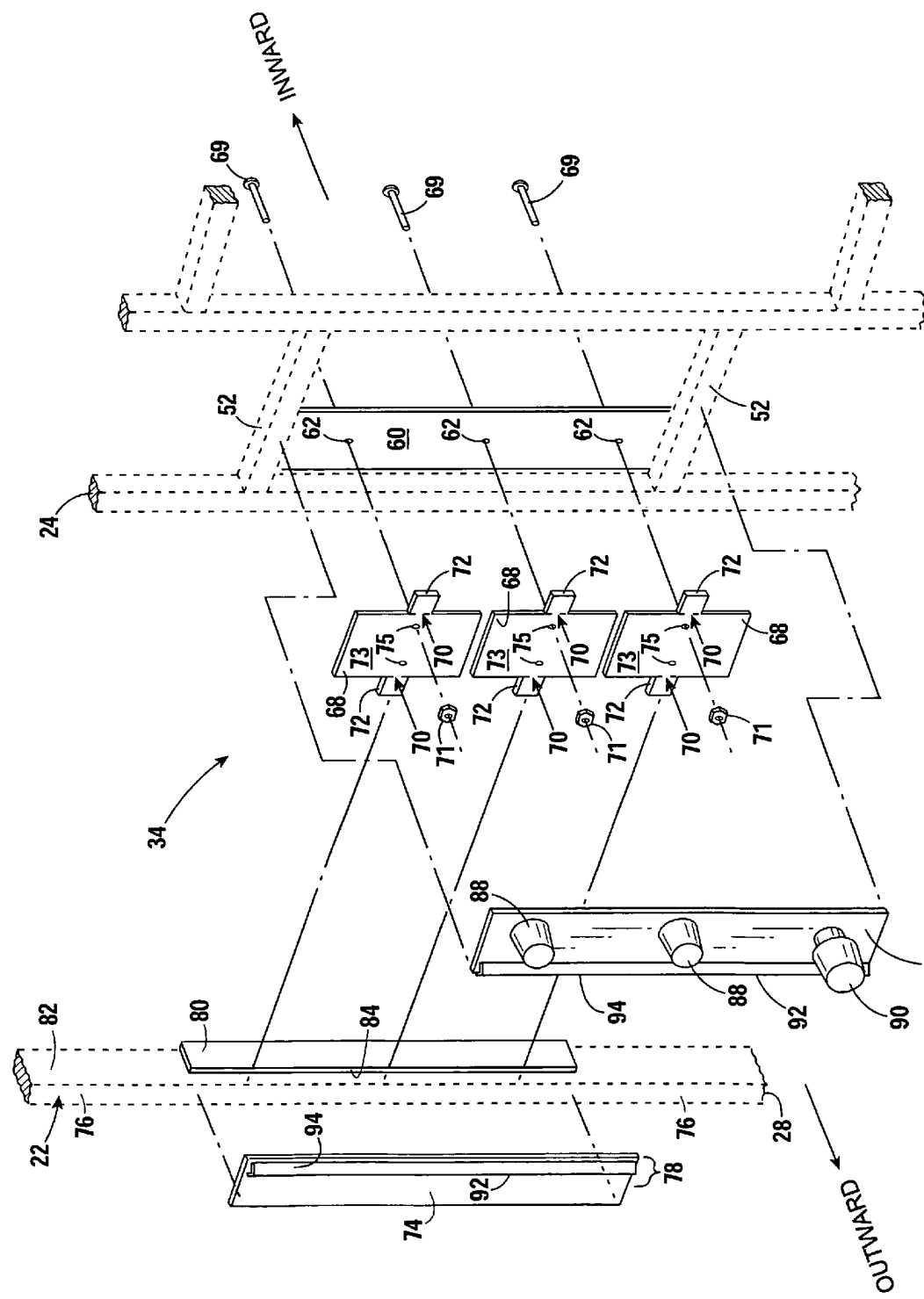
FIG. 3 is an isometric assembly view of the first restraint assembly of the preferred embodiment.

FIG. 3 is a front isometric assembly view of the first restraint assembly 34 that connects the lock jamb 28 to the door 24. Components of the system not part of the first restraint assembly 34 are shown as dashed lines for clarity. As noted with reference to FIG. 2, the first restraint assembly 34 of the preferred embodiment comprises a rectangular mounting plate 60 attached to two interior horizontal beams 52 of the door using conventional attachment techniques such as welding or fasteners. Three lock panels 68 having shear joints 70 at the intersection of tabbed portions 72 and a central body portion 73 are fastened to the mounting plate using bolts 69 and nuts 71. As used herein, a shear joint is a specifically designed joint fracturable upon application of a predetermined amount of force, which in the present invention is applied by the impact of one or more ballistic rounds. When impacted by a ballistic round, the shear joints 70 fracture to detach the corresponding tabbed portion 72 from the corresponding body portion 73, thereby detaching the door 24 from the lock jamb 28. Although the preferred embodiment of the system contemplates three lock panels 68 representing three separate lock-and-latch mechanisms of a typical door, in alternative embodiments, more or less lock panels 68 may be used to represent different door configurations.

In the preferred embodiment, the first restraint assembly 34 further comprises a rectangular jamb guard 74 fastened to the outward surface 76 of the lock jamb 28 and having an overhanging portion 78 extending interiorly toward the door 24. A rectangular steel blast guard 80 is secured to the interior surface 82 of the lock jamb 28 at substantially the same height as the mounting plate 60 is mounted on the door 24. Because the body portion 73 of each lock panel 68 is fastened to the mounting plate 60, each lock panel 68 is aligned so that one tab thereof is overlapped by the overhanging portion 78 of the jamb guard 74, which impedes movement of the door 24 in the outward direction. Similarly, inward movement of the door 24 is impeded by contact of the tabbed portion 72 of the lock panels 68 with the inward surface 84 of the blast guard 80. In addition to impeding movement of the lock panels 68—and thus the door 24—relative to the lock jamb 28, the blast guard 80 and jamb guard 74 provide additional protection against shot from the breaching device and debris.

To provide a more realistic training scenario, a knob plate 86 is fixed to the outward side of the door 24 and has dummy cylinders 88 and a dummy knob 90 laterally aligned with the shear joints 70 of the lock panels 68. Thus, a trainee may practice proper aiming at the simulated lock-and-latch mechanisms—i.e., the shear joints 70 of the lock panels 68—by using the dummy cylinders 88 and dummy knob 90 as points of reference.

The position of the knob plate 86 relative to the jamb guard 74 defines the opening 66 (see FIG. 1) through which a round may be targeted to impact the exposed shear joints 70. Two vertical rails 92 border the opening 66 and provide a contact point for the breaching device. For example, should the trainee use a combat shotgun for a simulated breach, the muzzle of the shotgun may contact the rails 92 to help acquaint the trainee with the optimal distance for muzzle placement during a breach. The interior surfaces 94 of the rails 92 are angled relative to the outward surfaces of the jamb guard 74 and knob plate 86 to help direct stray projectiles inward.

Figure 4A:
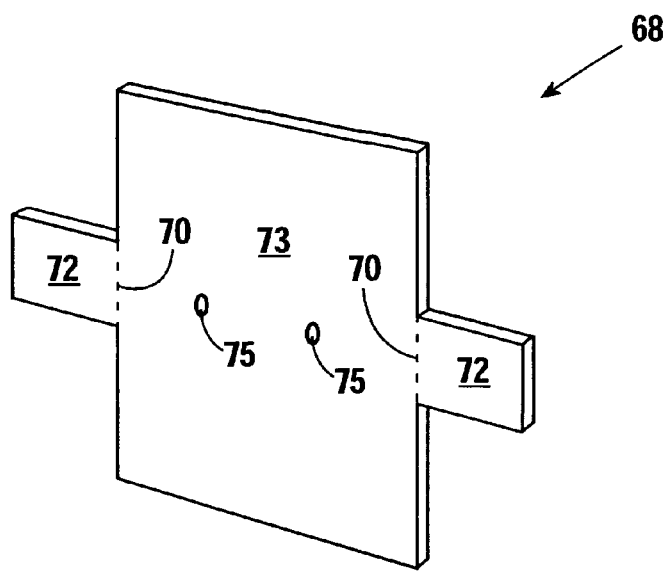
FIG. 4A and FIG. 4B are isometric views of a lock panel of the preferred embodiment in the intact and defeated states, respectively.
Figure 4B:
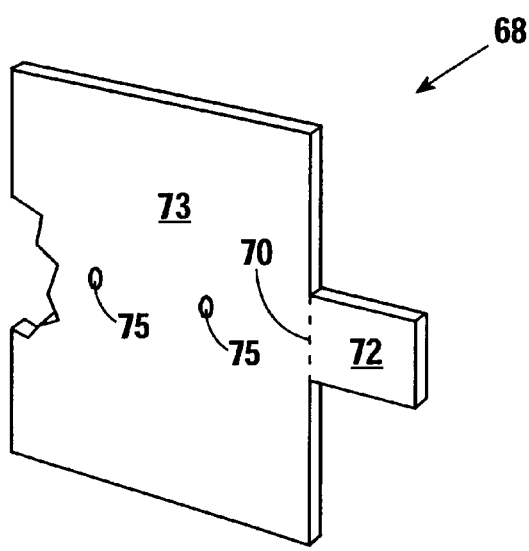

FIG. 4A and FIG. 4B depict a lock panel 68 of the preferred embodiment in the intact and defeated (i.e., fractured) states, respectively. As noted herein with reference to FIG. 3, the lock panel 68 has tabbed portions 72 adjacent a central body portion 73 that has mounting holes 75 disposed therethrough for fastening to the mounting plate 60 (see FIG. 3). The attachment points between the tabbed portions 72 and body portion 73 form shear joints 70 that fracture when impacted by a high-velocity shot. Because outward movement of the lock panel 68 is impeded by the blast guard 80 on one side and the lock panel 68 is fastened to the mounting plate 60 on the other side (see FIG. 3), when impacted by a projectile at the shear joint 70, the lock panel 68 is fractured, as shown in FIG. 4B, thus detaching the door 24 from the frame 22 at that restraint point.

In the preferred embodiment, each lock panel 68 may be used twice. After one shear joint 70 has been defeated, the lock panel 68 may be removed from the assembly 34, rotated 180-degrees, and reinserted into the first restraint assembly 34 so that another shear joint 70 is exposed to impact with a projectile. According to the preferred embodiment, each lock panel 68 is made from high-density polyethylene, although any number of alternative materials may be used.

Figure 5A:
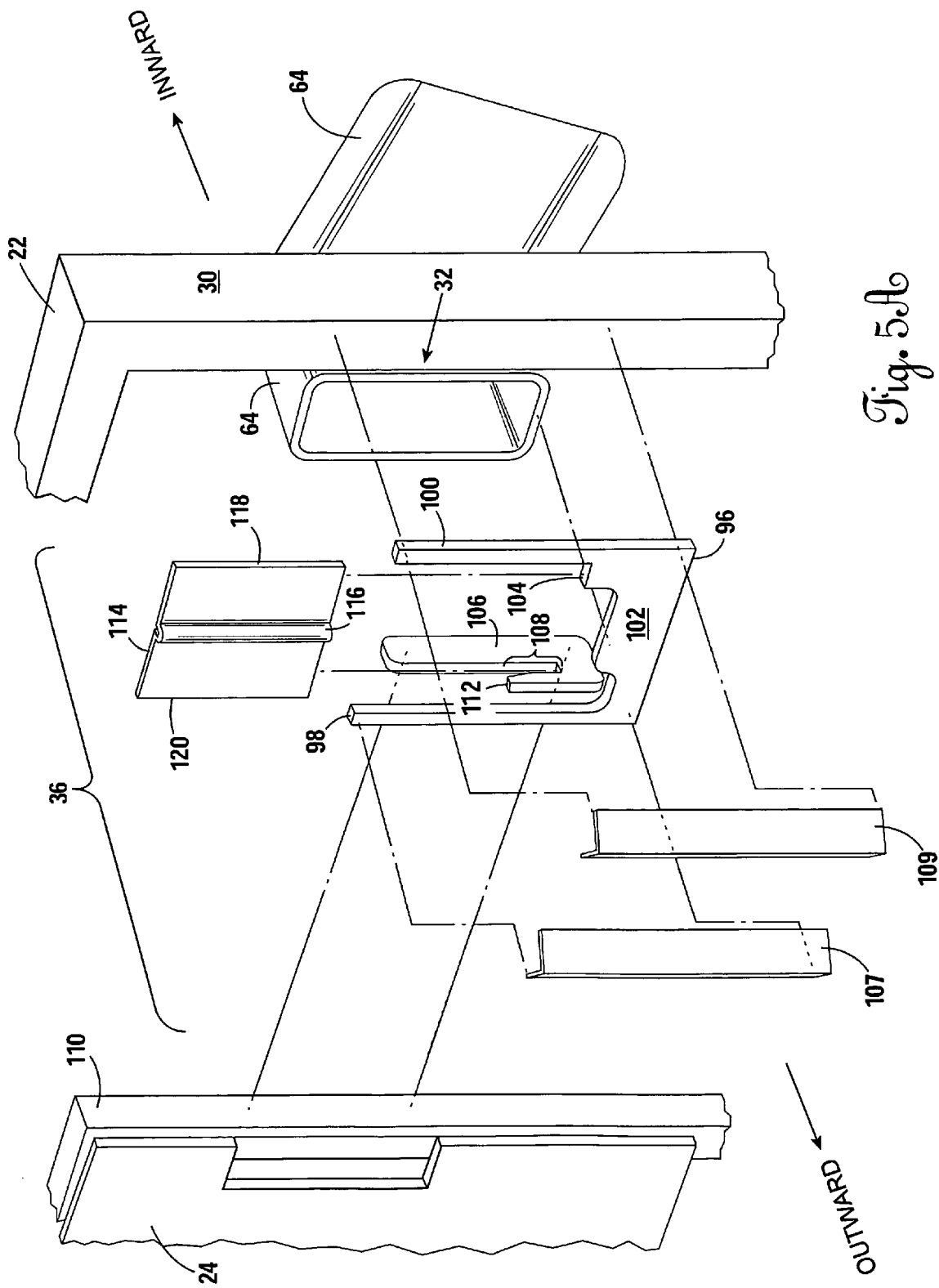
FIG. 5A is an isometric assembly view of the second restraint assembly of the preferred embodiment.
Figure 5B:
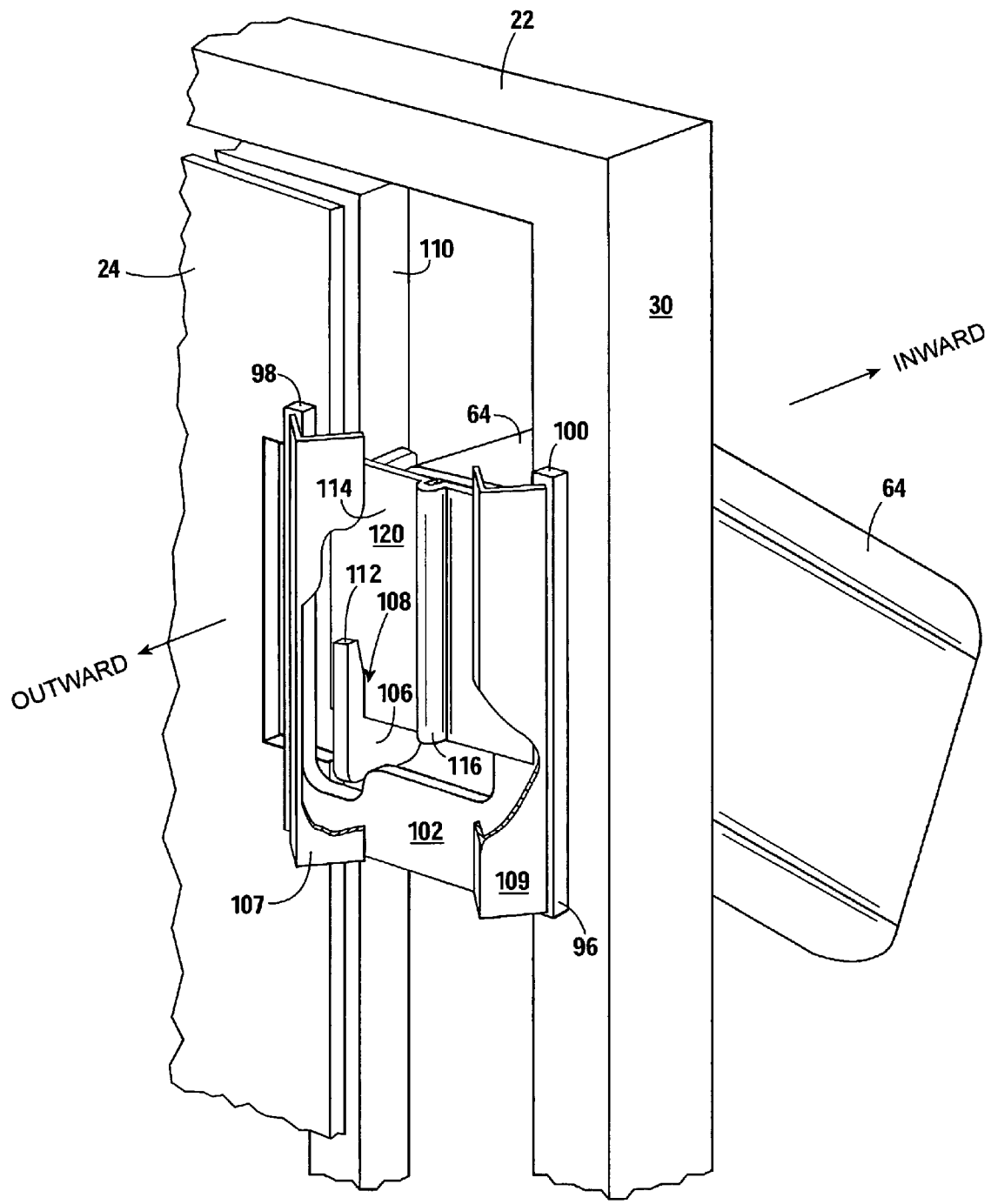
FIG. 5B is an isometric partial sectional view of the second restraint assembly.

FIG. 5A shows an assembly view of a second restraint assembly 36 of the preferred embodiment. FIG. 5B shows an isometric partial sectional view of the second shear restraint that details the connection of the door 24 to the frame 22. A U-mount 96 having inner and outer arms 98, 100 extending from a base portion 102, is mounted to the hinge jamb 30 along the outer arm 100 using conventional fastening techniques. A ledge 104 is integrally formed in the U-mount 96 adjacent the outer arm 100 and base 102. Two rail members 107, 109 approximately equal in length to the inner and outer arms 98, 100 are attached thereto.

Connecting the hinge jamb 30 to the door 24 is accomplished with a J-hook 106 having a vertically-positionable slot 108. The J-hook 106 is attached to the outer surface 110 of the door 24 such that the hook portion 112 protrudes outwardly and the slot 108 is accessible from the outward side of the system 20. When the system is "loaded"—that is, ready for simulated breaching—a hinge panel 114 having a centrally-positioned shear joint 116 rests with a first side 118 supported by the ledge 104 and a second side 120 positioned in the slot 108. The hinge panel 114 is positioned so that the shear joint 116 is parallel to and is approximately equidistant from the rail members 107, 109.

Inward and outward movement of the door 24 relative to the frame 22 at the point of restraint is impeded by placement of the hinge panel 114 within the slot 108 of the J-hook 106. If inwardly-directed force is exerted on the outward side of the door 24, the J-hook 106 will exert an inward force on the outward side of the hinge panel 114, which will, in turn, cause the hinge panel 114 to contact the inwardly-positioned shot deflector 64 and/or hinge jamb 30 and prevent further inward movement. Movement in the outward direction is impeded by contact of the outward surface of the hinge panel 114 against the rail members 107, 109. Depending on whether the remaining shear restraints (e.g., the first restraint assembly 34) have been defeated and the precise location of the inwardly-directed force applied to the door 24, the door 24 might also tend to rotate about the hinge panel 114 and out of the frame 22, in which case the outward surface of the first side 118 may rotate forward to contact the outer rail member 109, which contact prevents further rotational movement and holds the door 24 stationary relative to the frame 22.

Figure 6A:
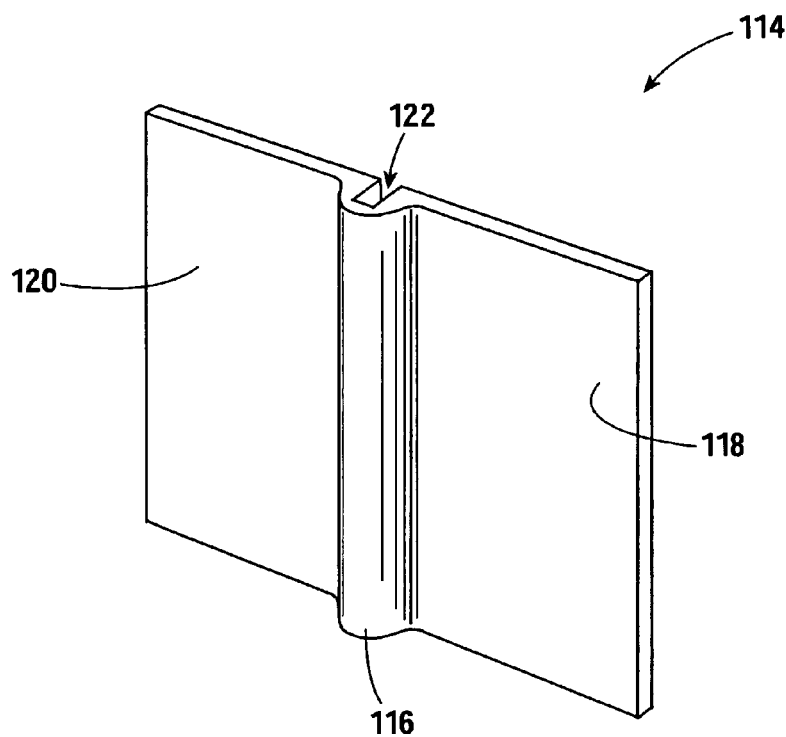
FIG. 6A and FIG. 6B are isometric views of a hinge panel of the preferred embodiment in the intact and defeated states, respectively.
Figure 6B:
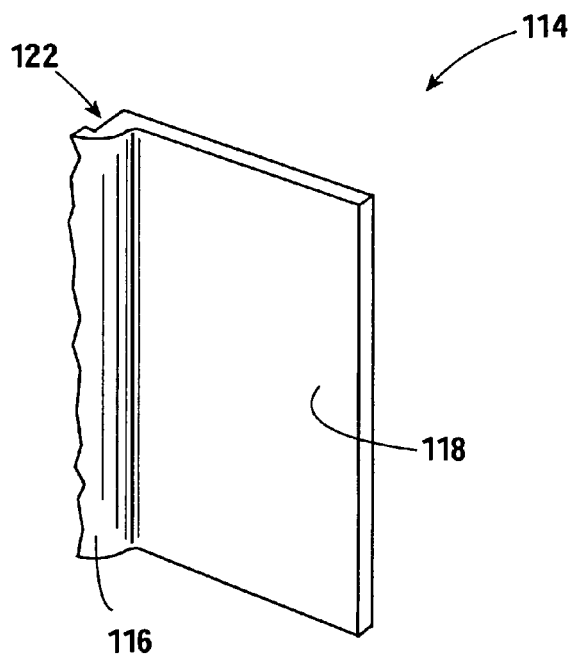

FIG. 6A and FIG. 6B depict a hinge panel 114 of the preferred embodiment in intact and defeated states, respectively. As noted hereinabove, each hinge panel 114 comprises first and second sides 118, 120 adjacent to an outward shear joint 116 that is fracturable upon impact by a projectile discharged from a breaching device. Fracturing each installed hinge panel 114 detaches the door 24 from the frame 22 and allows the door 24 to be moved outwardly or inwardly relative thereto, as described with reference to FIGS. 5A and 5B.

In the preferred embodiment, each hinge panel 114 is fabricated from high-impact polystyrene. Each hinge panel 114 may be either a "one shot" or "two shot" panel, thus allowing a trainee to train for more difficult breaches. As shown in FIG. 6A, which depicts a "one shot" panel 114, a datto cut 122 is disposed parallel to and inward of the shear joint 116, which weakens the shear joint 116. As a result, generally only one shot from a breaching device is required to fracture the shear joint 116. "Two shot" hinge panels are fabricated identically as "one shot" panels, but do not have a datto cut 122—that is, the inward surface is regular with no depressions or cuts disposed therein. "Two shot" panels generally require two shots from a breaching device to fracture the hinge panel 114.

Referring again to FIG. 1, by using "two shot" panels in each of the second shear restraints, the trainee will be typically required to fire six rounds to breach all three second restraint assemblies 36, which empties a typical six-round combat shotgun frequently used for ballistic breaching. This forces the trainee to practice reloading prior to defeating the first restraint assembly 34 (if it has not been yet been breached) or entering the structure. Moreover, by randomly selecting "one shot" and "two shot" panels for the second restraint assemblies 36, conditions can be created wherein the trainee, not known whether one-shot or two-shot hinge panels or both have been used, must verify that each second restraint assembly 36 has been defeated before moving on to the next. By interjecting this degree of uncertainty into the process, more realistic training scenarios are created.

FIG. 3 and FIGS. 5A and 5B are referred to in order to describe how the system may be used to simulate a door breach. Use of the system 20 is initiated by ensuring that the first restraint assembly 34 and any second restraint assemblies 36 are "loaded." As described with reference to FIG. 3, to load the first restraint assembly 34, the desired number of lock panels 68 are oriented such that a tabbed portion 72 of each is positioned between the jamb guard 74 and blast guard 80. The lock panels 68 are then fastened to the mounting plate 60 through a mounting hole 75 with bolts 69 and nuts 71. Similarly, as shown in FIGS. 5A and 5B, any second restraint assemblies 36 are loaded by inserting hinge panels 114 into the slot 108 of the J-hook 106 while resting the first side 118 of the hinge panel 114 on the on the ledge 104 of the U-mount 96.

When loaded, there is preferably no movement of the door 24 in the inward or outward directions. At the first restraint assembly 34, movement in the inward direction is impeded by contact of the tabbed portions 72 of the lock panels 68 with the blast guard 80, while movement in the outward direction is impeded by contact of the tabbed portions 72 with the protruding portion 78 of the jamb guard 74. Similarly, at each second restraint assembly 36, movement of the door 24 in the inward direction will be impeded by contact of the inward surface of the hinge panel 114 with the outward surface of the frame 22, as described with reference to FIG. 5A and FIG. 5B. Movement in the outward direction is impeded by contact of the outward surface of hinge panel 114 against the rail members 107, also as described with reference to FIG. 5A and FIG. 5B.

After the system 20 is loaded, a trainee may perform a simulated breach by defeating the first restraint assembly 34 and second restraint assemblies 36. In order to defeat the first restraint assembly 34, as described with reference to FIG. 3, the trainee executes a proper shot at the shear joint 70 of each lock panel 68 by placing the breaching device (e.g., a shotgun) proximal to the shear joint 70 and aimed in a direction normal to the outer surface. Dummy cylinders 88 and a dummy knob 90 may be used by the trainee for aiming the shot. Should the trainee shoot at the body portion 73, the shear joint 70 will not fracture to sever the tabbed portion 72, and the door 24 will remain fixed to the lock jamb 28.

In order to defeat each second restraint assemblies 36, as described with reference to FIGS. 5A and 5B, the trainee executes a proper shot at the shear joint 116 of the corresponding hinge panel 114. A properly executed shot will separate the first side 118 from the second side 120 by fracturing the shear joint 116, allowing the hinge panel 114 to fall from the corresponding second shear restraint assembly 36. This detaches the door 24 from the frame 22 at the corresponding restraint point and allows the door 24 to be moved relative to the frame 22. Once the door 24 is disconnected from the frame 22 at all restraint points 32 (see FIG. 1), the trainee may exert manual force on the door 24 (e.g., kicking the door inward) to complete the breach and simulate entering a structure by passing through the frame 22.

After concluding a simulated breach, the system 20 may be quickly reloaded for reuse. Reloading of the device for the next simulated breach is accomplish by removing any remaining broken hinge panels 114, lifting the door 24 to the original, "unbreached" position, and reloading the three second restraint assemblies 36 with new hinge panels 114. The first restraint assembly 34 may be reloaded by either (1) removing the defeated lock panel 68, rotating it 180-degrees, and reinserting the lock panel 68 with an unsheared tabbed portion 72 positioned between the jamb guard 74 and blast guard 80, or (2) by replacing the defeated lock panel 68 with a new lock panel.

Figure 7:
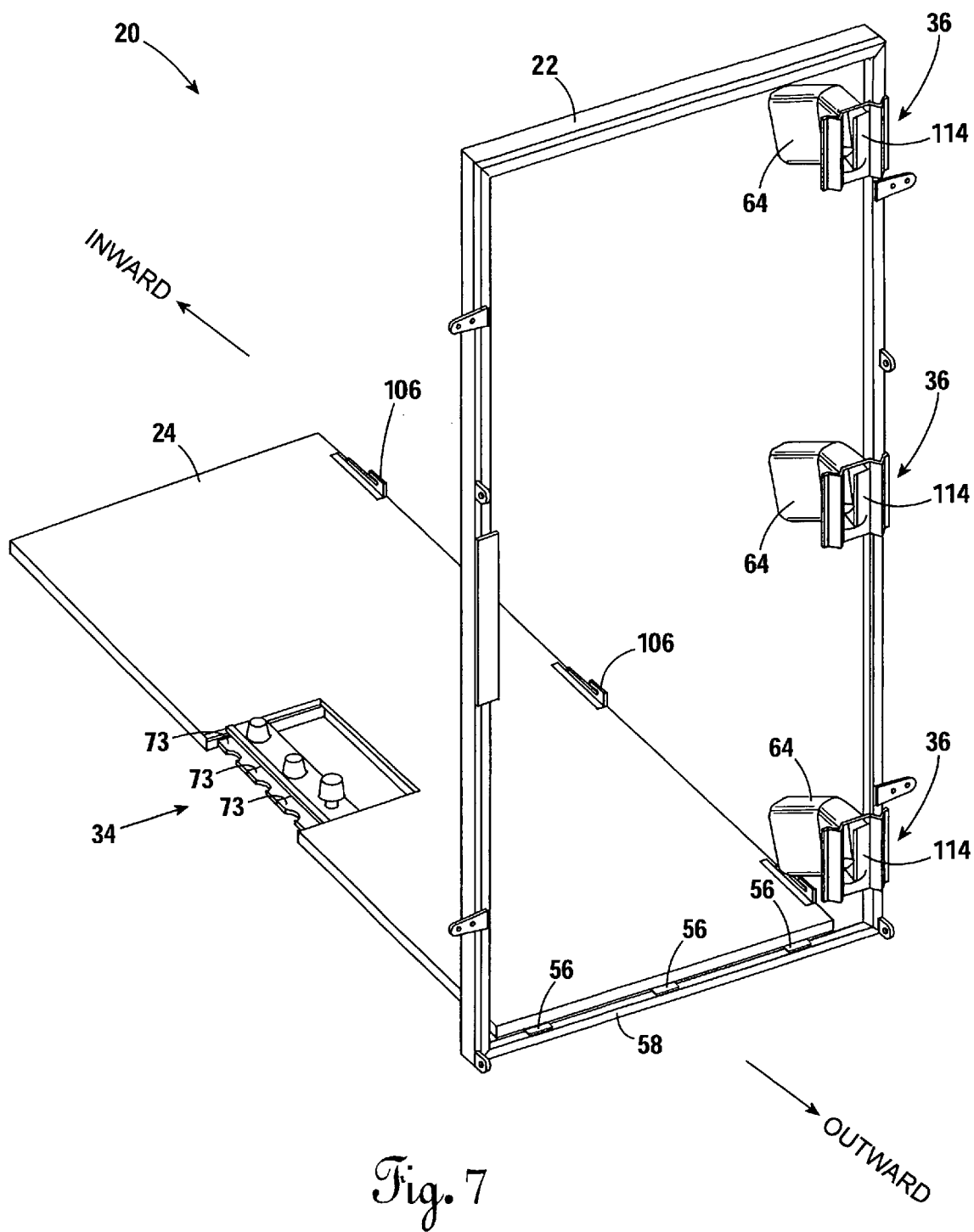
FIG. 7 is a front isometric view of the preferred embodiment wherein the first restraint assembly and second restraint assemblies have been defeated and the door system has been breached.

FIG. 7 depicts the system 20 after a simulated breach has been successfully conducted. After the first restraint assembly 34 and second restraint assemblies 36 have been defeated, the door 24 may be forced inward by the trainee. Attachment of the door 24 to the lower beam member 58 of the frame 22 using hinges 56 restricts the door 24 to a rotationally-downward movement relative to the frame 22. This restriction prevents unpredicted (and potentially unsafe) movement of the door 24 after breach and lessens the effort and time required by a trainee to reset the door 24 in the frame 22 in preparation of the next simulated breach. The body portions 73 remain fastened to the mounting plate 60 (not shown) until removed in preparation for the next simulated breach, although the sheared portions may be scattered proximally to the system 20 as a result of the exercise. During most simulated breaches, the hinge panels 114 will fall out of the second restraint assemblies 36 or will be directed through the shot deflectors 64 in a downward direction, although portions of the hinge panels 114 may remain in the second restraint assemblies 36 until manually removed. The J-hooks 106 remain attached to the door 24 after the hinge panels 114 have been defeated and the door 24 has been breached.

Figure 8:
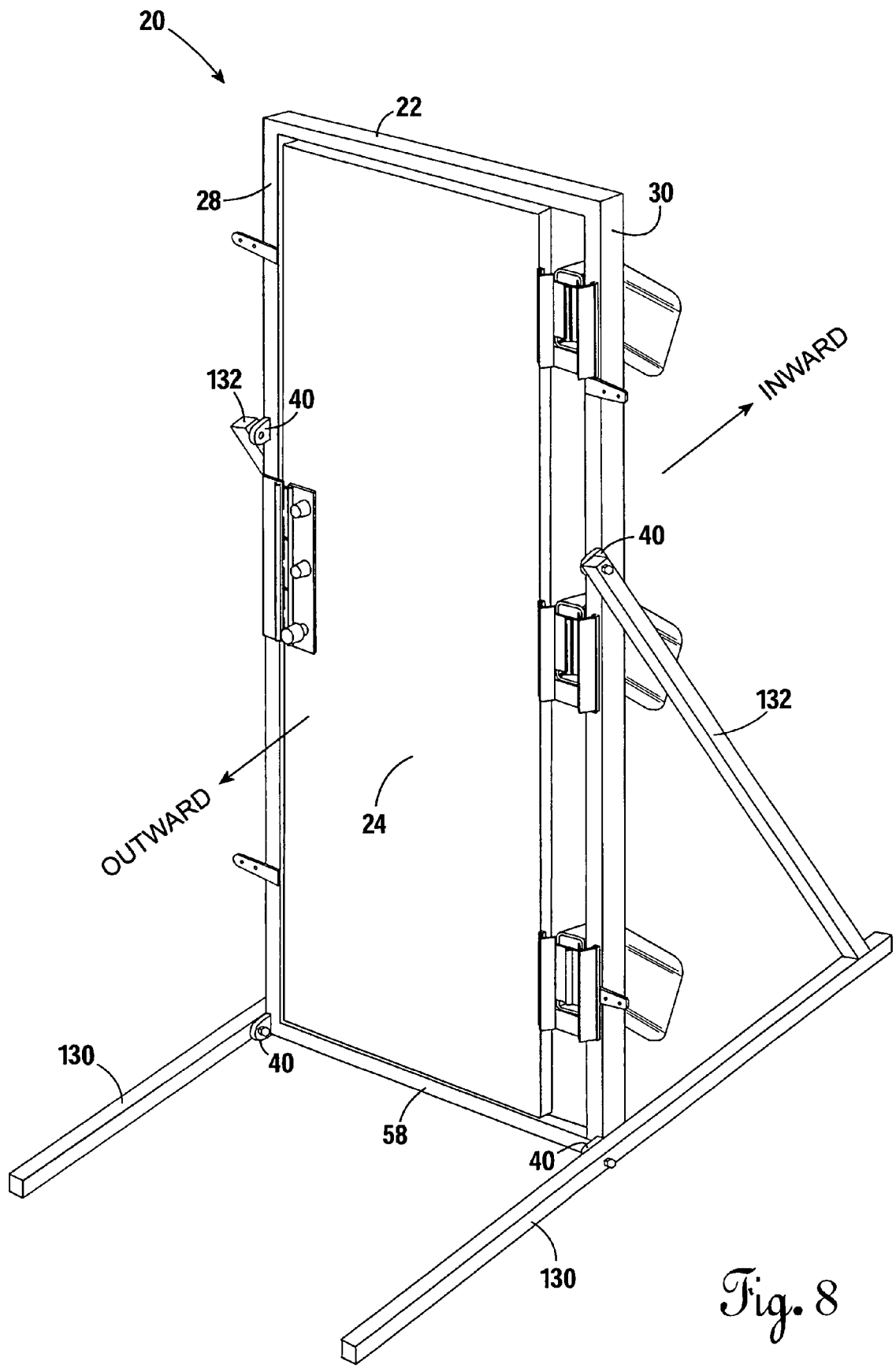
FIG. 8 is a front isometric view of an alternative embodiment of the present invention that comprises a portable base member to support the system in a free-standing configuration.

FIG. 8 depicts an alternative embodiment of the present invention that includes a steel base member 130 connected to the lower beam member 58 as well as connected to the hinge jamb 30 and lock jamb 28 using brace members 132 fastened to the leg mounts 40. Rather than installing the system 20 into an existing structure, this alternative embodiment allows free-standing use of the system 20 and thus training in better-suited areas for the discharge of breaching tools, such as open fields and the like.

The present invention is described in terms of a preferred illustrative embodiment of a specifically described door breach training system and alternative embodiment thereof. Those skilled in the art will recognize that alternative constructions of such a system can be used in carrying out the present invention. Other aspects, features, and advantages of the present invention may be obtained from a study of this disclosure and the drawings, along with the appended claims.

We claim:

1. A door breach training system comprising:
   a frame having a lock jamb and a hinge jamb;
   a door attached to said hinge jamb; and
   a first restraint assembly connecting said door to said lock jamb, said first restraint assembly comprising:
   a mounting plate fixed to the inward side of the door;
   at least one lock panel having two tabbed portions on opposing sides of a body portion, the junction of each tabbed portion with said body portion defining a shear joint targetable with a ballistic breaching device located outwardly from said system;
   a blast guard connected to an outward surface of said lock jamb;
   a jamb guard connected to an inner surface of said lock jamb;
   a knob plate fixed to the outward side of the door, the knob plate and the jamb guard defining an opening exposing the at least one lock panel when the door is positioned in the frame; and
   wherein said tabbed portion of said lock panel is positioned between said jamb guard and said blast guard to impede inward and/or outward movement of said door relative to said frame.

2. The door breach training system of claim 1 further comprising a base member connected to said frame and operative to support said frame and said door in a free-standing configuration.

3. The door breach training system of claim 1 further comprising at least one hinge connecting said door to said frame operative to allow downward-rotational movement of said door relative to said frame.

4. The door breach training system of claim 1 wherein said first restraint assembly further comprises at least one dummy cylinder attached to said door and laterally aligned with said shear joint of said at least one lock panel.

5. The door breach training system of claim 1 wherein said at least one lock panel is high-density polyethylene.

6. A door breach training system comprising:
   a frame having a lock jamb and a hinge jamb partially defining a door space for receiving a door;
   a door having an outward surface, said door attached to said lock jamb and occupying a portion of the door space; and
   at least one second restraint assembly connecting said door to said hinge jamb, said at least one second restraint assembly comprising:
   at least one hinge panel having a planar first side, a planar second side, and a shear joint formed between said planar first and second sides;
   a J-hook connected to the door, said J-hook having a hook portion extending outwardly past the outward surface of the door and defining a vertical slot for receiving a planar side of said at least one hinge panel;
   a U-mount having a base with two ends, an inner arm connected to a first end of said base, and an outer arm connected to a second end of said base, said outer arm being further connected to said hinge jamb;
   two rail members orientated parallel to said shear joint and fastened to the outward sides of said inner arm and said outer arm, said rail members positioned to impede outward movement of said at least one hinge panel relative to said frame; and
   wherein a planar side of said at least one hinge panel is within said slot and adjacent said U-mount to impede movement of said door outwardly and inwardly relative to said frame.

7. The door breach training system of claim 6 further comprising a base member connected to said frame and operative to support said frame and said door in a free-standing configuration.

8. The door breach training system of claim 6 further comprising at least one hinge connecting said door to said frame operative to allow downward-rotational movement of said door relative to said frame.

9. The door breach training system of claim 6 wherein said at least one hinge panel is high-impact polystyrene.

10. The door breach training system of claim 6 further comprising at least one shot deflector positioned inward of said at least one second restraint assembly operative to direct projectile and debris from a simulated breach in a predetermined direction.

11. The door breach training system of claim 10 wherein said predetermined direction is downward.

12. The door breach training system of claim 10 wherein said at least one shot deflector is a generally tubular body having an outward opening, an inward opening, and wherein said outward opening is positioned within the door space between said door and said frame proximal to and inwardly of said hinge panel.

* * * * *